United States Patent
Nam et al.

(10) Patent No.: US 10,241,250 B2
(45) Date of Patent: Mar. 26, 2019

(54) ADHESIVE COMPOSITION FOR POLARIZING PLATE, POLARIZING PLATE INCLUDING THE SAME, AND OPTICAL DISPLAY INCLUDING THE SAME

(71) Applicant: SAMSUNG SDI CO., LTD., Yongin-si, Gyeonggi-do (KR)

(72) Inventors: Irina Nam, Uiwang-si (KR); Inga Tuzovskaya, Uiwang-si (KR); Young Jong Kim, Uiwang-si (KR); Il Jin Kim, Uiwang-si (KR); Hwan Sung Cheon, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/951,398

(22) Filed: Nov. 24, 2015

(65) Prior Publication Data

US 2016/0152877 A1 Jun. 2, 2016

(30) Foreign Application Priority Data

Nov. 28, 2014 (KR) .................. 10-2014-0169210

(51) Int. Cl.
| | | |
|---|---|---|
| *C09J 133/08* | (2006.01) | |
| *G02B 5/30* | (2006.01) | |
| *C08F 220/18* | (2006.01) | |
| *C09J 133/06* | (2006.01) | |
| *C09J 175/04* | (2006.01) | |
| *C08G 18/62* | (2006.01) | |
| *C08G 18/80* | (2006.01) | |

(52) U.S. Cl.
CPC ............ *G02B 5/305* (2013.01); *C08F 220/18* (2013.01); *C08G 18/6283* (2013.01); *C08G 18/8029* (2013.01); *C09J 133/066* (2013.01); *C09J 175/04* (2013.01)

(58) Field of Classification Search
CPC ..................................................... C09J 133/08
See application file for complete search history.

(56) References Cited

U.S. PATENT DOCUMENTS

| | | | | |
|---|---|---|---|---|
| 2009/0233093 A1* | 9/2009 | Toyama | ................. | C09J 7/0217 |
| | | | | 428/354 |
| 2012/0183769 A1* | 7/2012 | Nasu | ..................... | C09J 133/24 |
| | | | | 428/352 |
| 2013/0211028 A1* | 8/2013 | Shinike | ................... | G06F 3/044 |
| | | | | 526/307.5 |
| 2017/0022396 A1* | 1/2017 | Kimura | ................ | C09J 133/066 |

FOREIGN PATENT DOCUMENTS

| | | | |
|---|---|---|---|
| CN | 1764679 A | | 4/2006 |
| CN | 101463234 A | | 6/2009 |
| CN | 101531873 A | | 9/2009 |
| CN | 102482546 A | | 5/2012 |
| CN | 103361004 A | | 10/2013 |
| JP | 2013056994 A | * | 3/2013 |
| JP | 2013119604 A | * | 6/2013 |
| JP | 5349019 B2 | | 11/2013 |
| JP | 5379410 B2 | | 12/2013 |
| KR | 10-2009-0098684 A | | 9/2009 |
| KR | 10-2012-0109400 A | | 10/2012 |
| KR | 10-2013-0141614 A | | 12/2013 |
| KR | 10-2014-0080361 A | | 6/2014 |

OTHER PUBLICATIONS

Machine Translation of JP 2013119604 A, 2013.*
Machine translation of JP-2013056994-A. (Year: 2013).*
Chinese Office action dated Apr. 27, 2017, corresponding to Chinese Patent Application No. 201510835511.X(8 pages).
Korean Office Action dated Jun. 20, 2017 in corresponding Korean Patent Application No. 10-2014-0169210 (5 pages).

* cited by examiner

*Primary Examiner* — Wenwen Cai

(74) *Attorney, Agent, or Firm* — Lewis Roca Rothgerber Christie LLP

(57) ABSTRACT

An adhesive composition for polarizing plates includes a (meth)acrylic copolymer prepared by copolymerization of a monomer mixture and a curing agent. The monomer mixture includes a hydroxyl group-containing (meth)acrylic monomer, a tertiary amine group-containing (meth)acrylic monomer and a monomer having a glass transition temperature (Tg) of about 100° C. or greater. The adhesive composition has a gel fraction of about 50% or greater after aging for 12 hours. An adhesive film is formed from the adhesive composition. An optical display includes the adhesive film.

16 Claims, 2 Drawing Sheets

ADHESIVE COMPOSITION FOR POLARIZING PLATE, POLARIZING PLATE INCLUDING THE SAME, AND OPTICAL DISPLAY INCLUDING THE SAME

CROSS-REFERENCE TO RELATED APPLICATION

This application claims priority to and the benefit of Korean Patent Application No. 10-2014-0169210, filed on Nov. 28, 2014 in the Korean Intellectual Property Office, the entire content of which is incorporated herein by reference.

BACKGROUND

1. Technical Field

Embodiments of the present invention relate to an adhesive composition for polarizing plates, a polarizing plate including the same, and an optical display including the same.

2. Description of the Related Art

A liquid crystal display includes a liquid crystal display panel and polarizing plates formed on both surfaces of the liquid crystal display panel. The polarizing plates may be stacked on the liquid crystal display panel via adhesive films for polarizing plates. Each of the adhesive films may be formed by coating an adhesive composition for polarizing plates onto one surface of the polarizing plate or a release film, followed by aging for a predetermined period of time.

The adhesive composition for polarizing plates is generally aged in an aging chamber for 3 to 7 days, or for 10 days or longer, as needed. As such, aging costs time and money. If the adhesive composition for polarizing plates is not subjected to sufficient aging, however, the properties of the adhesive film are poor (such as poor creep characteristics, peel strength, reliability, light leakage and reworkability), and the adhesive film therefore cannot be used in a polarizing plate. In addition, if the aging time is reduced, the adhesive composition can have poor pot-life, thereby causing poor coatability.

SUMMARY

According to embodiments of the present invention, an adhesive composition for polarizing plates is prepared by aging for a short period of time, and has a high gel fraction and good coatability even after aging for only 12 hours, thereby forming an adhesive film having good creep characteristics, reliability, light leakage prevention and reworkability. In some embodiments, a polarizing plate includes the adhesive film. In some embodiments, an optical display includes the polarizing plate.

In accordance with embodiments of the present invention, an adhesive composition for polarizing plates includes: a (meth)acrylic copolymer prepared by copolymerizing a monomer mixture and a curing agent. The monomer mixture includes a hydroxyl group-containing (meth)acrylic monomer, a tertiary amine group-containing (meth)acrylic monomer and a monomer having a glass transition temperature (Tg) of about 100° C. or greater. The adhesive composition has a gel fraction of about 50% or greater after aging for 12 hours, as calculated using Equation 1.

$$\text{Gel Fraction} = (WC-WA)/(WB-WA) \times 100 \qquad \text{Equation 1}$$

In Equation 1, WA, WB, and WC are as defined in the following detailed description.

In accordance with embodiments of the present invention, a polarizing plate includes an adhesive film for polarizing plates formed from the adhesive composition for polarizing plates described herein.

In accordance with embodiments of the present invention, an optical display may include the polarizing plate described herein.

DETAILED DESCRIPTION

Figure 1:
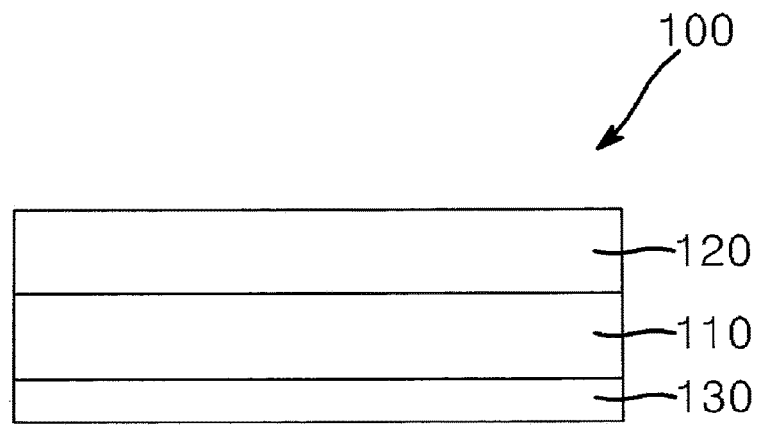
FIG. 1 is a schematic cross-sectional view of a polarizing plate according to embodiments of the present invention.

Embodiments of the present invention are described herein with reference to the accompanying drawings so that a person having ordinary skill in the art can more easily understand the subject matter. It should be understood, however, that the present invention is not limited to the described embodiments, and may be embodied in different ways. In the drawings, portions irrelevant to the description are omitted for clarity. Like components are denoted by like reference numerals throughout the specification.

As used herein, spatially relative terms such as "upper" and "lower" are defined with reference to the accompanying drawings. Thus, it is understood that "upper" can be used interchangeably with "lower". It is understood that when a layer is referred to as being "on" another layer (or region), it can be directly formed on the other layer or region, or intervening layer(s) (region(s)) may also be present. Also, it is understood that when a layer is referred to as being "directly on" another layer (or region), there is no intervening layer (region) therebetween.

As used herein, the term "(meth)acryl" refers to acryl and/or methacryl.

As used herein, "gel fraction" is defined according to the following Equation 1.

$$\text{Gel Fraction (\%)} = (WC-WA)/(WB-WA) \times 100 \qquad \text{Equation 1}$$

In Equation 1, WA is the weight of a wire mesh (200 mesh). WB is the total weight of the wire mesh and a specimen of an adhesive film for polarizing plates. The specimen is obtained by depositing 1.0 g of an adhesive composition for polarizing plates to a thickness of 20 μm on a release film, followed by aging the adhesive composition on the release film at 23° C. and 55% RH (relative humidity) for a predetermined period of time. The specimen is placed on the wire mesh and the weight of the mesh and specimen is recorded as WB. WC is the total weight of the wire mesh and the adhesive film, which total weight is recorded after placing the wire mesh and adhesive film in a sample bottle, adding 50 cc of ethyl acetate to the sample bottle, allowing the sample bottle to stand for 1 day, and then drying at 90° C. for 24 hours.

As used herein, "aging time" means an initial period of time for which the adhesive composition for polarizing plates has a gel fraction of about 50% or greater (as calculated according to Equation 1).

As used herein, the "glass transition temperature of a monomer" may be determined, for example, on a homopolymer of each monomer to be measured using a differential scanning calorimeter (DSC Q20 from TA Instruments). For example, the glass transition temperature may be determined on the homopolymer of each monomer by increasing the temperature to 160° C. at a rate of 20° C./min and allowing it to cool slowly, thereby maintaining the equilibrium state at 50° C., and obtaining an endothermic transition curve over the time period in which the temperature increases to 160° C. at a rate of 10° C./min. The point of inflection of the endothermic transition curve may be taken as the glass transition temperature.

According to embodiments of the invention, an adhesive composition for polarizing plates includes: a (meth)acrylic copolymer prepared by copolymerization of a monomer mixture and a curing agent. The monomer mixture includes a hydroxyl group-containing (meth)acrylic monomer, a tertiary amine group-containing (meth)acrylic monomer and a monomer having a glass transition temperature (Tg) of about 100° C. or greater.

The (meth)acrylic copolymer may have the hydroxyl group, the tertiary amine group, and moieties from the monomer having the glass transition temperature (Tg) of about 100° C. or greater in its polymer backbone, and can reduce the aging time of the adhesive composition for polarizing plates. In addition, the adhesive composition including the (meth)acrylic copolymer has a high gel fraction even after only a 12-hour aging, and does not exhibit (or exhibits a reduced amount of) changes in the gel fraction after aging for only 12 hours, resulting in high reliability.

For example, the adhesive composition for polarizing plates has a short aging time, and thus does not require use of an aging chamber, thereby providing good processability. In some embodiments, the adhesive composition for polarizing plates may have an aging time of about 12 hours or less, for example, about 5 hours to about 12 hours. Within these ranges of the aging time, the adhesive composition can exhibit good processability.

Since the adhesive composition for polarizing plates according to embodiments of the present invention has a high gel fraction even after only a 12-hour aging, the adhesive composition can sufficiently attach a polarizing plate to a liquid crystal display panel or an organic light emitting device even after aging for only 12 hours. In some embodiments, the adhesive composition for polarizing plates may have a gel fraction (G12) after a 12-hour aging of about 50% or greater. For example, the adhesive composition for polarizing plates may have a gel fraction (G12) after a 12-hour aging of about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90%. Further, the gel fraction (G12) after a 12-hour aging of the adhesive composition for polarizing plates may range from any one of these values to any other of these values. For example, the adhesive composition for polarizing plates may have a gel fraction (G12) after a 12-hour aging of about 59% to about 90%, or about 59% to about 70%. Within these ranges of the gel fraction after a 12-hour aging, the adhesive composition can be used in an adhesive film for polarizing plates, and does not require an aging chamber in the manufacture of the adhesive film, thereby providing good processability.

The adhesive composition for polarizing plates may have an absolute value of a difference between a gel fraction (G12) after a 12-hour aging and a gel fraction (G48) after a 48-hour aging (|G48−G12|) of about 5% or less, for example, about 0.1% to about 5%, about 0.1% to about 4%, or about 0.1% to about 3%. Within these ranges, the adhesive composition can be stable, thereby providing good reliability.

The (meth)acrylic copolymer may be prepared by copolymerization of the curing agent and the monomer mixture including the hydroxyl group-containing (meth)acrylic monomer, the tertiary amine group-containing (meth)acrylic monomer, and the monomer having a glass transition temperature (Tg) of about 100° C. or greater.

The hydroxyl group-containing (meth)acrylic monomer provides a hydroxyl group to the (meth)acrylic copolymer, which allows the (meth)acrylic copolymer to react with the curing agent. During aging of the adhesive composition for polarizing plates, the hydroxyl group of the (meth)acrylic copolymer reacts with the curing agent and this reaction is carried out for a reduced period of time with an increasing reaction rate between the hydroxyl group and the curing agent.

The hydroxyl group-containing (meth)acrylic monomer may include a (meth)acrylic acid ester containing a $C_1$ to $C_{20}$ alkyl group having at least one hydroxyl group. For example, the hydroxyl group-containing (meth)acrylic monomer may include at least one of 2-hydroxyethyl(meth)acrylate, 2-hydroxypropyl(meth)acrylate, 2-hydroxybutyl (meth)acrylate, 4-hydroxybutyl(meth)acrylate, 6-hydroxyhexyl(meth)acrylate, 1,4-cyclohexanedimethanolmono (meth)acrylate, 1-chloro-2-hydroxypropyl(meth)acrylate, diethylene glycolmono(meth)acrylate, 1,6-hexanediol mono (meth)acrylate, pentaerythritol tri(meth)acrylate, dipentaerythritol penta(meth)acrylate, neopentyl glycol mono (meth)acrylate, trimethylolpropane di(meth)acrylate, and/or trimethylolethane di(meth)acrylate, but the hydroxyl group-containing (meth)acrylic monomer is not limited thereto. A single hydroxyl group-containing (meth)acrylic monomer may be used alone, or a combination thereof may be used. In some embodiments, the hydroxyl group-containing (meth)acrylic monomer may include at least one of 2-hydroxyethyl(meth)acrylate, 2-hydroxypropyl (meth)acrylate, 2-hydroxybutyl(meth)acrylate, and/or 4-hydroxybutyl (meth)acrylate.

The hydroxyl group-containing (meth)acrylic monomer may be present in the monomer mixture in an amount of about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %. In addition, the hydroxyl group-containing (meth)acrylic monomer may be present in the monomer mixture in an amount ranging from any one of these values to any other of these values. For example, the hydroxyl group-containing (meth)acrylic monomer may be present in the monomer mixture in an amount of about 0.1 wt % to about 20 wt %, about 1 wt % to about 10 wt %, or about 5 wt % to about 10 wt %. Within these ranges, the hydroxyl group-containing (meth)acrylic monomer can allow the (meth)acrylic copolymer and the curing agent to be sufficiently cured after a reduced aging time while also providing good reliability and good pot-life, thereby improving coatability.

The tertiary amine group-containing (meth)acrylic monomer provides a tertiary amine group to the backbone of the (meth)acrylic copolymer, thereby reducing the aging time of the adhesive composition. Although the tertiary amine group of the (meth)acrylic monomer does not directly react with the curing agent, the tertiary amine group of the (meth) acrylic monomer has an unshared electron pair and thus can promote reaction between the hydroxyl group of the (meth) acrylic copolymer and the curing agent to reduce the aging time of the adhesive composition while increasing (e.g., evenly increasing) the crosslinking density of the adhesive film after aging. Furthermore, the tertiary amine group of the (meth)acrylic monomer permits smooth mixing of the adhesive composition without (or with a reduced amount of) gelation or formation of non-soluble precipitates.

When the adhesive composition includes a compound having a tertiary amine group (such as, e.g., N,N-dimethylethanolamine) instead of the tertiary amine group-containing (meth)acrylic monomer, the compound having a tertiary amine group is unevenly distributed within the adhesive composition, thereby providing an uneven crosslinking density of the adhesive film and deteriorating transparency of the adhesive film. Further, a (meth)acrylic copolymer prepared by copolymerization of a (meth)acrylic monomer having a primary amine group or a secondary amine group does not permit smooth mixing of the adhesive composition (due to the much higher reactivity of primary and secondary amine groups than tertiary amine groups), and can cause gelation or the formation of non-soluble precipitates in the adhesive composition during mixing.

The tertiary amine group-containing (meth)acrylic monomer may include at least one of N,N-(dimethylamino)ethyl (meth)acrylate and/or N,N-(diethylamino)ethyl (meth)acrylate. A single tertiary amine group-containing (meth)acrylic monomer may be used alone, or a combination thereof may be used.

The tertiary amine group-containing (meth)acrylic monomer may be present in the monomer mixture in an amount of about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, or about 5 wt %. The tertiary amine group-containing (meth)acrylic monomer may be present in the monomer mixture in an amount ranging from any one of these values to any other of these values. For example, the tertiary amine group-containing (meth)acrylic monomer may be present in the monomer mixture in an amount of about 0.01 wt % to about 5 wt %, or about 0.05 wt % to about 1 wt %. Within these ranges, the tertiary amine group-containing (meth)acrylic monomer can promote reaction between the (meth)acrylic copolymer and the curing agent to reduce aging time while also providing good pot-life, thereby improving the coatability of the adhesive composition.

The monomer having a glass transition temperature of about 100° C. or greater serves to increase the glass transition temperature of the (meth)acrylic copolymer to thereby reduce the aging time of the adhesive composition. In some embodiments, the monomer having a glass transition temperature of about 100° C. or greater may include a monomer having a glass transition temperature of about 100° C. to about 200° C. For example, the monomer having a glass transition temperature of about 100° C. or greater may include at least one of (meth)acryloyl morpholine, N-vinylpyrrolidone, and/or isobornyl (meth)acrylate. A single monomer having a glass transition temperature of about 100° C. or greater may be used alone, or a combination thereof may be used. In some embodiments, (meth)acryloyl morpholine can form a hydrogen bond with the hydroxyl group of the (meth)acrylic copolymer, thereby further reducing aging time.

The monomer having a glass transition temperature of about 100° C. or greater may be present in the monomer mixture in an amount of about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %. Further, the monomer having a glass transition temperature of about 100° C. or greater may be present in the monomer mixture in an amount ranging from any one of these values to any other of these values. For example, the monomer having a glass transition temperature of about 100° C. or greater may be present in an amount of about 1 wt % to about 30 wt %, about 5 wt % to about 20 wt %, or about 5 wt % to about 10 wt %. Within these ranges, the monomer having a glass transition temperature of about 100° C. or greater can further reduce the aging time of the adhesive composition while further improving reliability.

Since the tertiary amine group-containing (meth)acrylic monomer and the monomer having a glass transition temperature of about 100° C. or greater serve to reduce the aging time of the adhesive composition, the weight ratio of these monomers in the monomer mixture may be adjusted to provide further reductions in the aging time. For example, in the monomer mixture, the weight ratio of the monomer having a glass transition temperature of about 100° C. or greater to the tertiary amine group-containing (meth)acrylic monomer may be about 1:1, about 2:1, about 3:1, about 4:1, about 5:1, about 6:1, about 7:1, about 8:1, about 9:1, about 10:1, about 15:1, about 20:1, about 30:1, about 40:1, about 50:1, about 60:1, about 70:1, about 80:1, about 90:1, about 100:1, about 200:1, about 300:1, about 400:1, about 500:1, about 600:1, about 700:1, about 800:1, about 900:1, or about 1000:1. Additionally, the weight ratio of the monomer having a glass transition temperature of about 100° C. or greater to the tertiary amine group-containing (meth)acrylic monomer may range from any one of these values to any other of these values. For example, the weight ratio may range from about 1:1 to about 1000:1, about 10:1 to about 500:1, or about 10:1 to about 200:1. Within these ranges, the adhesive composition can have a further reduced aging time. For example, the tertiary amine group-containing (meth) acrylic monomer and the monomer having a glass transition temperature of about 100° C. or greater may be present in the monomer mixture in a total amount of about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %. In addition, the total amount of the tertiary amine group-containing (meth)acrylic monomer and the monomer having a glass transition temperature of about 100° C. or greater may range from any one of these values to any other of these values. For example, the tertiary amine group-containing (meth)acrylic monomer and the monomer having a glass transition temperature of about 100° C. or greater may be present in a total amount of about 5 wt % to about 30 wt %, about 5 wt % to about 25 wt %, or about 5 wt % to about 15 wt %. Within these ranges, the adhesive composition can have a further reduced aging time.

Since the monomer mixture for the (meth)acrylic copolymer does not include a monomer having a carboxyl group (—COOH group), the (meth)acrylic copolymer does not include a carboxyl group. As a result, the (meth)acrylic copolymer may have an acid value of about 0.3 mgKOH/g or less, for example, about 0 mgKOH/g to about 0.3 mgKOH/g, and can prevent an electrode film (such as an indium tin oxide (ITO) film) from being damaged by the carboxyl group upon use of the adhesive film in a touch-screen or LCD panel.

The monomer mixture for the (meth)acrylic copolymer may further include an alkyl-group containing (meth)acrylic monomer. The alkyl-group containing (meth)acrylic monomer can increase the mechanical strength of an adhesive film formed from the adhesive composition.

The alkyl group-containing (meth)acrylic monomer may include an unsubstituted $C_1$ to $C_{20}$ (for example, $C_4$ to $C_{12}$) alkyl group-containing (meth)acrylic acid ester. For example, the alkyl group-containing (meth)acrylic monomer may include at least one of methyl(meth)acrylate, ethyl (meth)acrylate, propyl(meth)acrylate, n-butyl(meth)acrylate, t-butyl(meth)acrylate, iso-butyl(meth)acrylate, pentyl (meth)acrylate, hexyl(meth)acrylate, 2-ethylhexyl(meth) acrylate, heptyl(meth)acrylate, octyl(meth)acrylate, iso-octyl(meth)acrylate, nonyl(meth)acrylate, decyl(meth) acrylate, and/or dodecyl(meth)acrylate, but the alkyl group-containing (meth)acrylic monomer is not limited thereto.

The alkyl group-containing (meth)acrylic monomer may be present in the monomer mixture in an amount of about 60 wt % to about 95 wt %, for example, about 75 wt % to about 90 wt %. Within these ranges, the alkyl group-containing (meth)acrylic monomer can improve the tack of the adhesive composition.

In some embodiments, the monomer mixture for the (meth)acrylic copolymer may include about 0.1 wt % to about 20 wt % of the hydroxyl group-containing (meth) acrylic monomer, about 0.01 wt % to about 5 wt % of the tertiary amine group-containing (meth)acrylic monomer, about 1 wt % to about 30 wt % of the monomer having a glass transition temperature (Tg) of about 100° C. or greater, and about 60 wt % to about 95 wt % of the alkyl group-containing (meth)acrylic monomer. Within these ranges of the monomers, the adhesive composition can have a reduced aging time, good pot-life, and can be used to form an adhesive film for polarizing plates.

In some embodiments, the monomer mixture for the (meth)acrylic copolymer may include the hydroxyl group-containing (meth)acrylic monomer and the tertiary amine group-containing (meth)acrylic monomer in a weight ratio of about 500:1 to about 1:1, for example about 300:1 to about 3:1, or about 100:1 to about 5:1. Within these ranges of the monomers in the monomer mixture, the adhesive composition can have a reduced aging time and exhibit good balance between coatability and reliability.

In some embodiments, the monomer mixture for the (meth)acrylic copolymer may include the hydroxyl group-containing (meth)acrylic monomer and the monomer having a glass transition temperature (Tg) of about 100° C. or greater in a weight ratio of about 5:1 to about 0.2:1, for example about 3:1 to about 0.3:1, or about 2:1 to about 0.5:1. Within these ranges of the monomers, the adhesive composition can have a reduced aging time, good pot-life, and can be used to form an adhesive film for polarizing plates.

The (meth)acrylic copolymer may have a glass transition temperature of about −45° C. to about −30° C., for example, about −40° C. to about −30° C. Within these ranges, the adhesive composition can have a further reduced aging time and improved durability.

The (meth)acrylic copolymer may have a weight average molecular weight (Mw) of about 100,000 g/mol to about 2,000,000 g/mol, for example, about 200,000 g/mol to about 2,000,000 g/mol, or about 200,000 g/mol to about 1,300,000 g/mol. Within these ranges, the adhesive composition can exhibit good adhesive strength, suppress (or reduce) light leakage, and have good durability. The weight average molecular weight can be obtained by polystyrene conversion in gel permeation chromatography.

The (meth)acrylic copolymer may have a polydispersity index of about 2.5 to about 15.0. Within this range, the adhesive composition including the (meth)acrylic copolymer can have good durability.

The (meth)acrylic copolymer may have a viscosity at 25° C. of about 2,000 cPs to about 20,000 cPs, for example, about 3,500 cPs to about 15,000 cPs. Within these ranges, the adhesive composition including the (meth)acrylic copolymer can have good coatability.

The (meth)acrylic copolymer may be prepared by adding an initiator to the monomer mixture, followed by polymerization of the copolymer by any suitable mechanism, for example, suspension polymerization, emulsion polymerization, solution polymerization, or the like. The polymerization may be performed at about 65° C. to about 80° C. for about 6 hours to about 10 hours. As the initiator, any suitable initiator may be used, some nonlimiting examples of which include azo-based polymerization initiators (such as, e.g., azobisisobutyronitrile, azobiscyclohexanecarbonitrile, and dimethyl 2,2'-azobis(2-methylpropionate)), and peroxide polymerization initiators (such as, e.g., benzoyl peroxide and acetyl peroxide). The initiator may be present in an amount of about 0.01 parts by weight to about 10 parts by weight based on 100 parts by weight of the monomer mixture of the (meth)acrylic copolymer. Within this range, the initiator can regulate the molecular weight of the (meth) acrylic copolymer.

The curing agent reacts with the (meth)acrylic copolymer to form an adhesive film, and may include, for example, an isocyanate curing agent. In some embodiments, a bi- or higher functional, for example, a bi-functional, tri-functional, tetra-functional, penta-functional or hexa-functional, curing agent, may be used. A single one of these curing agents may be used alone, or a combination thereof may be used. For example, the curing agent may include hexamethylene diisocyanate (HDI); a toluene diisocyanate (TDI), such as 2,4-toluene diisocyanate, or 2,6-toluene diisocyanate; a xylene diisocyanate(XDI), such as 4,4'-methylenediphenyl diisocyanate (MDI), 1,3-xylene diisocyanate, or 1,4-xylene diisocyanate; hydrogenated toluene diisocyanate; isophorone diisocyanate; 1,3-bisisocyanatomethylcyclohexane; tetramethylxylene diisocyanate; 1,5-naphthalene diisocyanate; 2,2,4-trimethylhexamethylene diisocyanate; 2,4,4-trimethylhexamethylene diisocyanate; an adduct of toluene diisocyanate with trimethylolpropane, including a trilene adduct of trimethylolpropane/toluene diisocyanate; an adduct of xylene diisocyanate with trimethylolpropane, triphenylmethanetriisocyanate, and/or methylenebistriisocyanate, but the curing agent is not limited thereto.

The curing agent may be present in an amount of about 0.01 parts by weight to about 5 parts by weight, for example, about 0.05 parts by weight to about 2 parts by weight, based on 100 parts by weight of the (meth)acrylic copolymer (on a dry weight basis). Within these ranges, the curing agent can provide sufficient curing effect.

In some embodiments, the adhesive composition for polarizing plates may include at least one of a silane coupling agent and/or a reworking agent.

The silane coupling agent serves to enhance adhesion of a polarizing plate to a liquid crystal display panel, and any suitable silane coupling agent may be used. For example, the silane coupling agent may include at least one of an epoxy group-containing silicon compound, such as 3-glycidoxypropyltrimethoxysilane, 3-glycidoxypropylmethyldimethoxysilane, and/or 2-(3,4-epoxycyclohexyl)ethyltrimethoxysilane; a polymerizable unsaturated group-containing silicon compound, such as vinyltrimethoxysilane, vinyltriethoxysilane, and/or (meth)acryloxypropyltrimethoxysilane; an amino group-containing silicon compound, such as 3-am inopropyltrimethoxysilane, N-(2-aminoethyl)-3-aminopropyltrimethoxysilane, and/or N-(2-aminoethyl)-3-aminopropylmethyldimethoxysilane; an acetoacetyl group-containing silicon compound, such as acetoacetate propyltrimethoxysilane; and/or a mercapto group-containing silicon compound, such as 3-mercaptopropylmethyldimethoxysilane and/or 3-mercaptopropyltrimethoxysilane, but the silane coupling agent is not limited thereto. In some embodiments, an acetoacetyl group-containing silicon compound may be used as the silane coupling agent to improve moisture resistance.

The silane coupling agent may be present in an amount of about 0.001 parts by weight to about 5 parts by weight, for example, about 0.01 parts by weight to about 1 parts by weight based on 100 parts by weight of the (meth)acrylic copolymer. Within these ranges of the silane coupling agent, the adhesive composition can have improved moisture resistance.

The reworking agent serves to enhance reworkability of the adhesive film, and may include a polysiloxane oligomer, but is not limited thereto. The reworking agent may be present in an amount of about 0.001 parts by weight to about 5 parts by weight, for example about 0.01 parts by weight to about 1 part by weight, based on 100 parts by weight of the (meth)acrylic copolymer. Within these ranges, the reworking agent can provide suitable reworking effect.

The adhesive composition for polarizing plates may further include one or more additives. The additives may be any suitable additives known in the art, and may include, for example, tackifiers, antioxidants, antistatic agents, corrosion inhibitors, leveling agents, surface lubricants, dyes, pigments, anti-foaming agents, fillers, light stabilizers, and the like. The additives may be present in an amount of about 0.001 parts by weight to about 5 parts by weight based on 100 parts by weight of the (meth)acrylic copolymer.

In accordance with embodiments of the present invention, a polarizing plate includes an adhesive film for polarizing plates formed from the adhesive composition for polarizing plates according to embodiments of the invention. A polarizing plate according to embodiments of the invention is illustrated in FIG. 1. Referring to FIG. 1, a polarizing plate 100 according to embodiments of the invention may include a polarizer 110, a first optical film 120 formed on an upper surface of the polarizer 110, and an adhesive film 130 formed on a lower surface of the polarizer 110. The adhesive film 130 may be formed of an adhesive composition for polarizing plates according to embodiments of the invention. As a result, the polarizing plate does not suffer from (or suffers from a reduced number of) failures, such as falling out, detachment, and bubbling of the adhesive film, and the polarizing plate exhibits good peel strength and durability while also preventing (or reducing) light leakage.

The polarizer 110 has a molecular alignment in a specific direction to allow transmission of light in the specific direction when mounted on a liquid crystal display. The polarizer 110 may be fabricated by dyeing a polyvinyl alcohol film with iodine or a dichroic dye, followed by stretching the film in a particular direction.

The polarizer 110 may have a thickness of about 3 µm to about 100 µm, for example, about 10 µm to about 25 µm. Within these ranges, the polarizer can be used in a polarizing plate for optical displays.

The first optical film 120 serves to protect the polarizer 110, and may be an optically transparent film. For example, the first optical film may be formed of at least one resin selected from among cellulose resins including triacetylcellulose, polyester resins including polyethylene terephthalate, polybutylene terephthalate, polyethylene naphthalate, and polybutylene naphthalate, cyclic polyolefin resins, polycarbonate resins, polyether sulfone resins, polysulfone resins, polyamide resins, polyimide resins, polyolefin resins, polyacrylate resins, polyvinyl alcohol resins, polyvinyl chloride resins, and polyvinylidene chloride resins. A single one of these resins may be used alone, or a combination thereof may be used.

The first optical film 120 may have a thickness of about 10 µm to about 200 µm. Within this range, the first optical film can be applied to an optical display.

The adhesive film 130 may be fabricated by aging the adhesive composition for polarizing plates according to embodiments of the invention. For example, the adhesive film may be fabricated by aging the adhesive composition at about 23° C. and about 55% RH for about 12 hours. The adhesive film 130 may have a thickness of about 1 µm to about 100 µm. Within this range, the adhesive film can be applied to an optical display.

Although not shown in FIG. 1, an adhesive layer for polarizing plates may be formed between the polarizer 110 and the first optical film 120 to attach the polarizer to the first optical film. The adhesive layer for polarizing plates may be formed of any suitable adhesive for polarizing plates. For example, the adhesive for polarizing plates may include at least one of a water-based adhesive including a polyvinyl alcohol resin and/or a photocurable adhesive.

Figure 2:
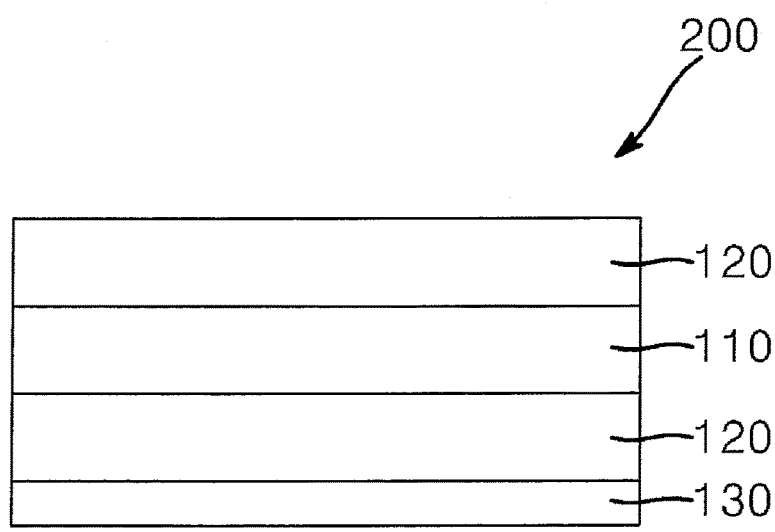
FIG. 2 is a schematic cross-sectional view of a polarizing plate according to embodiments of the present invention.

A polarizing plate according to embodiments of the invention is illustrated in FIG. 2. Referring to FIG. 2, a polarizing plate 200 according to embodiments of the invention may include a polarizer 110, a first optical film 120 formed on an upper surface of the polarizer 110, a first optical film 120 formed on a lower surface of the polarizer 110, and an adhesive film 130 formed on a lower surface of the first optical film 120. The adhesive film 130 may be formed of an adhesive composition for polarizing plates according to embodiments of the invention. As a result, the polarizing plate does not suffer from (or suffers from a reduced number of) failures, such as falling out, detachment, and bubbling of the adhesive film, and the polarizing plate exhibits good peel strength and durability while also preventing (or reducing) light leakage. The polarizing plate depicted in FIG. 2 is substantially the same as the polarizing plate depicted in FIG. 1, except that the first optical film 120 may be further formed between the polarizer 110 and the adhesive film 130. As the first optical film 120 is formed between the polarizer 110 and the adhesive film 130, it can increase the mechanical strength of the polarizing plate.

Figure 3:
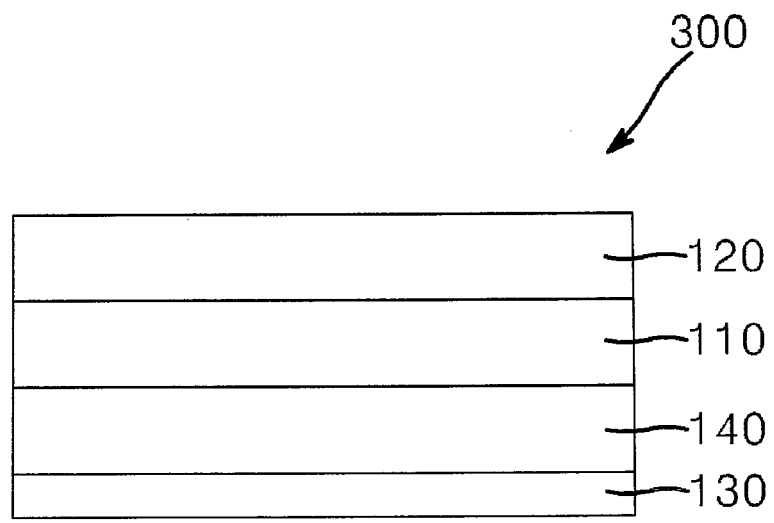
FIG. 3 is a schematic cross-sectional view of a polarizing plate according to embodiments of the present invention.

A polarizing plate according to embodiments of the invention is depicted in FIG. 3. Referring to FIG. 3, a polarizing plate 300 according to embodiments of the invention may include a polarizer 110, a first optical film 120 formed on an upper surface of the polarizer 110, a second optical film 140 formed on a lower surface of the polarizer 110, and an adhesive film 130 formed on a lower surface of the second optical film 140. The adhesive film 130 may be formed of an adhesive composition for polarizing plates according to embodiments of the invention. As a result, the polarizing plate does not suffer from (or suffers from a reduced number of) failures, such as falling out, detachment, and bubbling of the adhesive film, and the polarizing plate exhibits good peel strength and durability while also preventing light leakage. The polarizing plate depicted in FIG. 3 is substantially the same as the polarizing plate depicted in FIG. 1, except that the second optical film 140 may be further formed between the polarizer 110 and the adhesive film 130.

The second optical film 140 serves to protect the polarizer 110 and may be formed of a different kind of resin than the first optical film 120. For example, the second optical film 140 may be formed of at least one resin selected from among cellulose resins including triacetylcellulose, polyester resins including polyethylene terephthalate, polybutylene terephthalate, polyethylene naphthalate, and polybutylene naphthalate, cyclic polyolefin resins, polycarbonate resins, polyether sulfone resins, polysulfone resins, polyamide resins, polyimide resins, polyolefin resins, polyacrylate resins, polyvinyl alcohol resins, polyvinyl chloride resins, and polyvinylidene chloride resins. A single one of these resins may be used alone, or a combination thereof may be used.

The second optical film 140 may have a thickness of about 10 μm to about 200 μm. Within this range, the second optical film can be applied to an optical display.

Although not shown in FIG. 3, an adhesive layer for polarizing plates may be formed between the polarizer 110 and the second optical film 140 to attach the polarizer 110 to the second optical film 140. The adhesive layer for polarizing plates may be formed of any suitable adhesive for polarizing plates. For example, the adhesive for polarizing plates may include at least one of a water-based adhesive including a polyvinyl alcohol resin and/or a photocurable adhesive.

In accordance with embodiments of the present invention, an optical display includes the polarizing plate according to embodiments of the invention. The optical display may be a liquid crystal display or an organic light emitting device display, but is not limited thereto.

Hereinafter, embodiments of the present invention are described with reference to some examples. However, it is understood that these examples are provided for illustration only and are not to be construed in any way as limiting the embodiments of the present invention.

PREPARATIVE EXAMPLE 1

84.95 parts by weight of n-butyl acrylate, 10 parts by weight of acryloyl morpholine, 5 parts by weight of 4-hydroxybutyl acrylate, and 0.05 parts by weight of N,N-(dimethylamino)ethyl acrylate were placed in a 1000 ml reactor provided with a thermometer, a stirrer, a nitrogen feeding tube and a reflux condenser, followed by the addition of methylethylketone as a solvent and stirring of the components for 30 minutes while purging with nitrogen. The inner temperature of the reactor was increased to 65° C., and 0.02 parts by weight of dimethyl 2,2'-azobis(2-methylpropionate) (V-601, Wako) was added as an initiator to the mixture. The mixture was reacted at 65° C. for 4 hours, followed by increasing the inner temperature of the reactor to 70° C. After additional reaction at 70° C. for 2 hours, the inner temperature of the reactor was decreased to room temperature, thereby preparing a (meth)acrylic copolymer.

PREPARATIVE EXAMPLES 2 to 15

(Meth)acrylic copolymers were prepared as in Preparative Example 1, except that the type and amount of (meth)acrylic monomer, and the amount of the initiator were varied, as listed in Table 1.

TABLE 1

| | (Meth)acrylic monomer (parts by weight) | | | | | | | Amount of initiator (parts by weight) | Weight average molecular weight of (meth)acrylic copolymer (g/mol) | Glass transition temperature of (meth)acrylic copolymer (° C.) |
|---|---|---|---|---|---|---|---|---|---|---|
| | BA | ACMO | NVP | IBXA | 4-HBA | DMAEA | DEAEA | | | |
| Preparative Example 1 | 84.95 | 10 | — | — | 5 | 0.05 | — | 0.02 | 1,105,354 | −35.12 |
| Preparative Example 2 | 84.9 | 10 | — | — | 5 | 0.1 | — | 0.02 | 1,164,334 | −35.10 |
| Preparative Example 3 | 84.5 | 10 | — | — | 5 | 0.5 | — | 0.02 | 1,067,955 | −35.49 |
| Preparative Example 4 | 84 | 10 | — | — | 5 | 1 | — | 0.02 | 1,094,566 | −34.89 |
| Preparative Example 5 | 84.9 | 10 | — | — | 5 | — | 0.1 | 0.02 | 1,046,577 | −35.65 |
| Preparative Example 6 | 89.9 | 5 | — | — | 5 | 0.1 | — | 0.02 | 1,164,466 | −39.56 |
| Preparative Example 7 | 84.9 | 5 | — | — | 10 | 0.1 | — | 0.02 | 1,146,444 | −38.10 |
| Preparative Example 8 | 79.9 | — | 10 | — | 10 | 0.1 | — | 0.02 | 1,146,444 | −32.14 |
| Preparative Example 9 | 84.9 | — | — | 10 | 5 | 0.1 | — | 0.02 | 1,201,231 | −36.57 |
| Preparative Example 10 | 84.9 | 10 | — | — | 5 | 0.1 | — | 0.04 | 805,668 | −34.99 |

TABLE 1-continued

| | (Meth)acrylic monomer (parts by weight) | | | | | | | Amount of initiator (parts by weight) | Weight average molecular weight of (meth)acrylic copolymer (g/mol) | Glass transition temperature of (meth)acrylic copolymer (° C.) |
|---|---|---|---|---|---|---|---|---|---|---|
| | BA | ACMO | NVP | IBXA | 4-HBA | DMAEA | DEAEA | | | |
| Preparative Example 11 | 84.9 | 10 | — | — | 5 | 0.1 | — | 0.06 | 621,362 | −35.23 |
| Preparative Example 12 | 84.9 | 10 | — | — | 5 | 0.1 | — | 0.08 | 250,164 | −35.70 |
| Preparative Example 13 | 85 | 10 | — | — | 5 | — | — | 0.02 | 1,122,666 | −35.32 |
| Preparative Example 14 | 85 | — | — | — | 5 | 10 | — | 0.02 | 1,048,200 | −44.51 |
| Preparative Example 15 | 85 | 10 | — | — | — | 5 | — | 0.02 | 1,102,000 | −38.11 |

*BA: n-butyl acrylate, ACMO: acryloyl morpholine, NVP: N-vinyl pyrrolidone, IBXA: isobornyl acrylate, 4-HBA: 4-hydroxybutyl acrylate, DMAEA: N,N-(dimethylamino)ethyl acrylate, DEAEA: N,N-(diethylamino)ethyl acrylate

EXAMPLE 1

In terms of solids content, 40 parts by weight of the (meth)acrylic copolymer prepared in Preparative Example 1 and 0.06 parts by weight of a TDI adduct (CORONATE L-45, Soken Chemical& Engineering, Ltd.) as an isocyanate curing agent were mixed, thereby preparing an adhesive composition for polarizing plates.

EXAMPLES 2 to 12

Adhesive compositions for polarizing plates were prepared as in Example 1 except that the type of (meth)acrylic copolymer and the amount of the curing agent were varied, as listed in Tables 2 and 3.

COMPARATIVE EXAMPLES 1 to 3

Adhesive compositions for polarizing plates were prepared as in Example 1, except that the type of (meth)acrylic copolymer, and the amount of the curing agent were varied as listed in Tables 2 and 3.

TABLE 2

| | | Example | | | | | | |
|---|---|---|---|---|---|---|---|---|
| | | 1 | 2 | 3 | 4 | 5 | 6 | 7 |
| (Meth)acrylic copolymer (parts by weight) | Preparative Example 1 | 40 | — | — | — | — | — | — |
| | Preparative Example 2 | — | 40 | — | — | — | — | — |
| | Preparative Example 3 | — | — | 40 | — | — | — | — |
| | Preparative Example 4 | — | — | — | 40 | — | — | — |
| | Preparative Example 5 | — | — | — | — | 40 | — | — |
| | Preparative Example 6 | — | — | — | — | — | 40 | — |
| | Preparative Example 7 | — | — | — | — | — | — | 40 |
| Curing agent (parts by weight) | | 0.06 | 0.06 | 0.06 | 0.06 | 0.06 | 0.06 | 0.06 |

TABLE 3

| | | Example | | | | | Comparative Example | | |
|---|---|---|---|---|---|---|---|---|---|
| | | 8 | 9 | 10 | 11 | 12 | 1 | 2 | 3 |
| (Meth)acrylic copolymer (parts by weight) | Preparative Example 8 | 40 | — | — | — | — | — | — | — |
| | Preparative Example 9 | — | 40 | — | — | — | — | — | — |
| | Preparative Example 10 | — | — | 40 | — | — | — | — | — |

TABLE 3-continued

|  | Example | | | | | Comparative Example | | |
|---|---|---|---|---|---|---|---|---|
|  | 8 | 9 | 10 | 11 | 12 | 1 | 2 | 3 |
| Preparative Example 11 | — | — | — | 40 | — | — | — | — |
| Preparative Example 12 | — | — | — | — | 40 | — | — | — |
| Preparative Example 13 | — | — | — | — | — | 40 | — | — |
| Preparative Example 14 | — | — | — | — | — | — | 40 | — |
| Preparative Example 15 | — | — | — | — | — | — | — | 40 |
| Curing agent (parts by weight) | 0.06 | 0.06 | 0.07 | 0.08 | 0.1 | 0.06 | 0.06 | 0.06 |

The adhesive compositions for polarizing plates prepared in the Examples and Comparative Examples, and adhesive films and polarizing plates prepared using the same were evaluated as to the properties listed in Table 4.

TABLE 4

|  | 12-hour gel fraction (%) | 48-hour gel fraction (%) | Creep | Pot-life | Reliability | | Light leakage |
|---|---|---|---|---|---|---|---|
|  |  |  |  |  | Heat resistance reliability | Moist resistance reliability |  |
| Example 1 | 61 | 63 | ○ | ○ | ○ | ○ | ○ |
| Example 2 | 63 | 63 | ○ | ○ | ○ | ○ | ○ |
| Example 3 | 65 | 66 | ○ | ○ | ○ | ○ | ○ |
| Example 4 | 65 | 65 | ○ | ○ | ○ | ○ | ○ |
| Example 5 | 61 | 63 | ○ | ○ | ○ | ○ | ○ |
| Example 6 | 60 | 63 | ○ | ○ | ○ | ○ | ○ |
| Example 7 | 64 | 64 | ○ | ○ | ○ | ○ | ○ |
| Example 8 | 68 | 68 | ○ | ○ | ○ | ○ | ○ |
| Example 9 | 61 | 63 | ○ | ○ | ○ | ○ | ○ |
| Example 10 | 62 | 65 | ○ | ○ | ○ | ○ | ○ |
| Example 11 | 60 | 63 | ○ | ○ | ○ | ○ | ○ |
| Example 12 | 59 | 61 | ○ | ○ | ○ | ○ | ○ |
| Comparative Example 1 | 42 | 48 | X | ○ | X | X | — |
| Comparative Example 2 | 35 | 42 | X | X | X | Δ | ○ |
| Comparative Example 3 | 48 | 51 | X | X | X | X | ○ |

As shown in Table 4, the adhesive compositions for polarizing plates according to embodiments of the present invention had high gel fractions after 12-hour aging, and thus had reduced aging times while also having good pot-life, thereby providing good processability. In addition, the adhesive compositions for polarizing plates according to embodiments of the present invention exhibited only small differences between the gel fraction after 48-hour aging and the gel fraction after 12-hour aging, thereby exhibiting good reliability. Furthermore, the adhesive compositions according to embodiments of the present invention exhibited good creep characteristics and reliability after 12-hour aging, while also suppressing light leakage, and thus could be used to form adhesive films for polarizing plates after only a 12-hour aging.

In contrast, the adhesive compositions prepared according to Comparative Examples 1 to 3 (which did not include one of the monomers for the (meth)acrylic copolymer according to embodiments of the present invention) had low gel fractions or poor pot-life after 12-hour aging.

1) Gel fraction: Gel fraction was measured according to Equation 1.

$$\text{Gel fraction} = (WC - WA)/(WB - WA) \times 100 \qquad \text{Equation 1}$$

In Equation 1, WA is the weight of a wire mesh (200 mesh). WB is the total weight of the wire mesh and a specimen of the adhesive film for polarizing plates. The specimen is obtained by depositing 1.0 g of the adhesive composition for polarizing plates to a thickness of 20 μm on a release film, followed by aging the adhesive composition for polarizing plates on the release film at 23° C. and 55% RH for a predetermined period of time. The specimen is placed on the wire mesh, and the total weight is taken as WB. WC is the total weight of the wire mesh and the adhesive film after being placed in a sample bottle, left for 1 day after adding 50 cc of ethyl acetate to the sample bottle, and then dried at 90° C. for 24 hours.

In measuring the gel fraction, a polyethylene terephthalate film (thickness: 38 μm) was used as the release film, a 100 mL wide mouth bottle was used as the sample bottle, and the wire mesh was a 200 mesh net. 12-hour gel fraction refers to the gel fraction after aging for 12 hours (as calculated by Equation 1), and 48-hour gel fraction refers to the gel fraction after aging for 48 hours (as calculated by Equation 1).

2) Creep: The adhesive composition was applied to a polyethylene terephthalate film, dried to a thickness of 20 μm, followed by aging at 23° C. and 55% RH for 12 hours, thereby preparing an adhesive film (thickness: 20 μm). A specimen was prepared by stacking the adhesive film (thickness: 20 μm) on a polarizing plate (including a triacetylcellulose film, a PVA polarizer, and a triacetylcellulose film sequentially stacked), and cut to a size of 15 mm×100 mm. Then, the specimen was stacked onto an alkali-free glass (alkali-free soda glass) substrate to have a contact area of 15 mm×15 mm, followed by measurement of creep characteristics using a TEXTURE ANALYZER TA.XT Plus (load cell: 5 kg, EKO Instruments). The creep characteristics were evaluated at a constant temperature of 22° C. under a load of 2,250 gf for 1000 seconds. A creep length of 30 μm to 300 μm was rated as ○, a creep length of greater than 300 μm to 800 μm was rated as Δ, and a creep length of greater than 800 μm was rated as ×.

3) Pot-life: A specimen was prepared by mixing the adhesive composition for polarizing plates with methylethylketone and allowing the mixture to stand for 30 minutes to remove bubbles, followed by measuring viscosity at 23° C. (A, unit: cPs) using a Brookfield DV-II+Pro viscometer. In preparing the specimen, methylethylketone (10 g to 40 g) was added such that the specimen had a viscosity at 23° C. of 1500 to 2000 cPs depending upon the weight average molecular weight of the (meth)acrylic copolymer and the amount (20 g) of the adhesive composition in terms of solids content. Thereafter, the specimen was left in a constant temperature/humidity chamber at 23° C. and 55% RH for 24 hours, followed by measurement of viscosity (B, unit: cPs) in the same manner. A difference value (B−A) of 200 cPs or less was rated as O and a difference value (B−A) of greater than 200 cPs was rated as X.

4) Reliability: After preparing a polarizing plate in which a triacetylcellulose film, a PVA polarizer, and a triacetylcellulose film were sequentially stacked, the adhesive composition for polarizing plates was coated onto one of the triacetylcellulose films of the polarizing plate. Then, the adhesive composition was aged in a constant temperature/humidity chamber at 23° C. and 55% RH for 12 hours and cut into two samples, each of which was 150 mm×90 mm (length×width). The two samples were laminated on opposite surfaces of an alkali-free glass substrate, which was then left in an autoclave at 323K for 1,000 seconds, thereby preparing specimens for evaluation of reliability. Heat resistance of the specimens was evaluated by observing bubbling or peeling after being left at 85° C. for 250 hours. Moisture resistance of the specimens was evaluated by observing bubbling or peeling after being left at 60° C. and 95% RH for 250 hours. No detachment, no dragging, or no bubbling was rated as ○, minute detachment, minute dragging or minute bubbling was rated as Δ, and occurrence of detachment, dragging, or bubbling was rated as ×.

Figure 4:
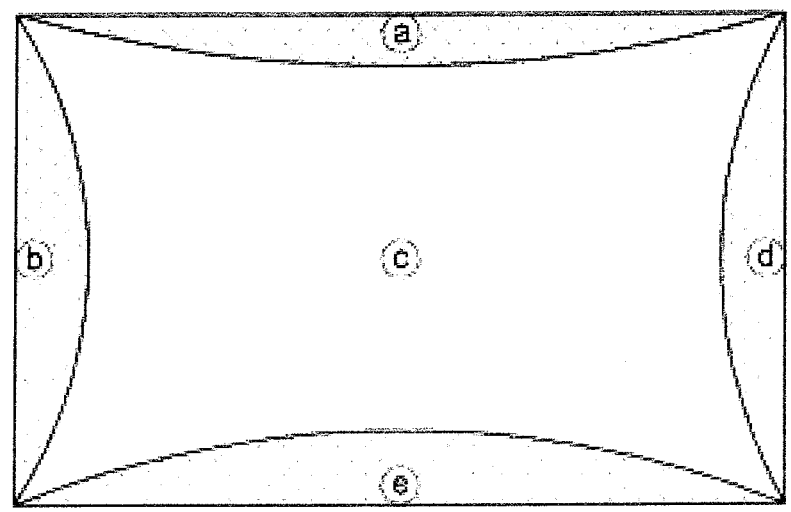
FIG. 4 is a conceptual drawing depicting locations on a panel for taking light leakage measurements.

5) Light leakage: After preparing a polarizing plate in which a triacetylcellulose film, a PVA polarizer, and a triacetylcellulose film were sequentially stacked, the adhesive composition for polarizing plates was coated to a thickness of 20 μm on one of the triacetylcellulose films of the polarizing plate. Then, the adhesive composition was aged in a constant temperature/humidity chamber at 23° C. and 55% RH for 12 hours to prepare specimens. Thereafter, the specimens were cut to a size of 140 mm×80 mm (length×width, 7 inch) and attached to opposite surfaces of a glass substrate. The specimens for light leakage evaluation were stacked on the opposite surfaces of the glass substrate such that their optical axes were orthogonal to each other. The specimens were maintained at 323 K for 1,000 seconds in an autoclave under vacuum in order to obtain good adhesion. After operating an LCD using the specimens, brightness at the front side of the display panel was measured at a height of 1 m using a brightness tester (RISA, Hiland Co., Ltd.). Specifically, brightness ⓒ at the central region of the panel and brightness ⓐ, ⓑ, ⓓ and ⓔ at the edges of the panel at which light leakage occurred were measured. As shown in FIG. 4, brightness measuring points were placed at four midpoints of each side of the panel. Here, each side of the panel adjoined the circumference of a circle for brightness measurement having a radius of 0.5 cm. In FIG. 4, ⓐ, ⓑ, ⓒ, ⓓ and ⓔ indicate brightness measuring points. The degree of light leakage (ΔL) was quantified according to the following Equation 2. A lower ΔL value indicates better light leakage characteristics, which were evaluated according to the following criteria.

$$L=[(a+b+d+e)/4]/c-1 \quad \text{Equation 2}$$

In Equation 2, a, b, d and e represent brightness values measured at the brightness measurement points ⓐ, ⓑ, ⓓ and ⓔ in FIG. 4, respectively, and c is the brightness value at the central region ⓒ in FIG. 4.

○—No light leakage, 0≤ΔL≤0.1.
Δ—Slight light leakage, 0.1<ΔL<0.3.
×—Severe light leakage, 0.3≤ΔL.

Throughout this disclosure, certain terms are employed, but they are used in a generic and descriptive sense only and not for purposes of limitation. Additionally, while certain exemplary embodiments of the present invention are illustrated and described, in some instances, as would be apparent to those of ordinary skill in the art as of the filing of the present application, the features, characteristics, and/or elements described in connection with a particular embodiment may be used alone or in combination with features, characteristics, and/or elements described in connection with other embodiments, unless specifically indicated otherwise. Accordingly, it is understood by those of ordinary skill in the art that various changes to the described embodiments may be made without departing from the spirit and scope of the present disclosure as set forth in the following claims.

What is claimed is:

1. An adhesive composition for polarizing plates, comprising a (meth)acrylic copolymer and a curing agent,
wherein the (meth)acrylic copolymer is prepared by copolymerization of a monomer mixture, the monomer mixture comprising:
about 4 wt % to about 20 wt % of a hydroxyl group-containing (meth)acrylic monomer,
a tertiary amine group-containing (meth)acrylic monomer, and
a monomer having a homopolymer glass transition temperature (Tg) of about 100° C. or greater, the monomer having a homopolymer Tg of about 100° C. or greater comprising at least one of (meth)acryloyl morpholine or isobornyl (meth)acrylate and being present in the monomer mixture in an amount of about 5 wt % to about 19 wt %, wherein the monomer mixture comprises the hydroxyl group-containing (meth)acrylic monomer and the tertiary amine group-containing (meth)acrylic monomer in a weight ratio of about 500:1 to about 1:1, the adhesive composition having a gel fraction of about 50% or greater after aging for 12 hours, as calculated by Equation 1:

$$\text{Gel Fraction} = (WC-WA)/(WB-WA) \times 100 \quad \text{Equation 1}$$

wherein:

WA is a weight of a wire mesh (200 mesh);

WB is a total weight of the wire mesh and a specimen of an adhesive film for polarizing plates, the adhesive film being obtained by depositing 1.0 g of the adhesive composition for polarizing plates to a thickness of 20 μm on a release film, followed by aging the adhesive composition for polarizing plates on the release film at 23° C. and 55% RH for a period of time; and WC is a total weight of the wire mesh and the adhesive film after placing the wire mesh and the adhesive film in a sample bottle, adding 50 cc of ethyl acetate to the sample bottle, allowing the sample bottle to stand for 1 day, and drying the sample bottle at 90° C. for 24 hours.

2. The adhesive composition for polarizing plates according to claim 1, wherein the adhesive composition has an absolute value (|G48−G12|) of a difference between a gel fraction (G12) after a 12-hour aging and a gel fraction (G48) after a 48-hour aging of about 5% or lower.

3. The adhesive composition for polarizing plates according to claim 1, wherein the tertiary amine group-containing (meth)acrylic monomer comprises at least one of N,N-(dimethylamino)ethyl (meth)acrylate, or N,N-(diethylamino)ethyl (meth)acrylate.

4. The adhesive composition for polarizing plates according to claim 1, wherein the monomer having a homopolymer glass transition temperature (Tg) of about 100° C. or greater further comprises N-vinylpyrrolidone.

5. The adhesive composition for polarizing plates according to claim 1, wherein the tertiary amine group-containing (meth)acrylic monomer is present in the monomer mixture in an amount of about 0.01 wt % to about 5 wt %, and the monomer having a homopolymer glass transition temperature of about 100° C. or greater is present in the monomer mixture in an amount of about 5 wt % to about 19 wt %.

6. The adhesive composition for polarizing plates according to claim 1, wherein the monomer mixture further comprises an alkyl group-containing (meth)acrylic monomer.

7. The adhesive composition for polarizing plates according to claim 6, wherein the monomer mixture comprises about 4 wt % to about 20 wt % of the hydroxyl group-containing (meth)acrylic monomer, about 0.01 wt % to about 5 wt % of the tertiary amine group-containing (meth)acrylic monomer, about 5 wt % to about 19 wt % of the monomer having a homopolymer glass transition temperature (Tg) of about 100° C. or greater, and about 60 wt % to about 95 wt % of the alkyl group-containing (meth)acrylic monomer.

8. The adhesive composition for polarizing plates according to claim 1, wherein the monomer mixture comprises the hydroxyl group-containing (meth)acrylic monomer and the monomer having a homopolymer glass transition temperature (Tg) of about 100° C. or greater in a weight ratio of about 4:1 to about 0.2:1.

9. The adhesive composition for polarizing plates according to claim 1, wherein the (meth)acrylic copolymer has a glass transition temperature of about −45° C. to about −30° C.

10. The adhesive composition for polarizing plates according to claim 1, wherein the (meth)acrylic copolymer has an acid value of about 0.3 mgKOH/g or lower.

11. The adhesive composition for polarizing plates according to claim 1, wherein the (meth)acrylic copolymer has a weight average molecular weight of about 100,000 g/mol to about 2,000,000 g/mol.

12. The adhesive composition for polarizing plates according to claim 1, wherein the curing agent comprises an isocyanate curing agent.

13. The adhesive composition for polarizing plates according to claim 1, further comprising an acetoacetyl group-containing silane coupling agent.

14. The adhesive composition for polarizing plates according to claim 1, further comprising a reworking agent.

15. A polarizing plate comprising an adhesive for polarizing plates formed from the adhesive composition for polarizing plates according to claim 1.

16. An optical display comprising the polarizing plate according to claim 15.

* * * * *